July 4, 1939.  A. URFER  2,164,601

SETTABLE ALTIMETER

Filed April 6, 1932  3 Sheets-Sheet 1

INVENTOR.
ADOLF URFER.
BY Stephen Gerstvik
ATTORNEY

July 4, 1939.  A. URFER  2,164,601
SETTABLE ALTIMETER
Filed April 6, 1932  3 Sheets-Sheet 2
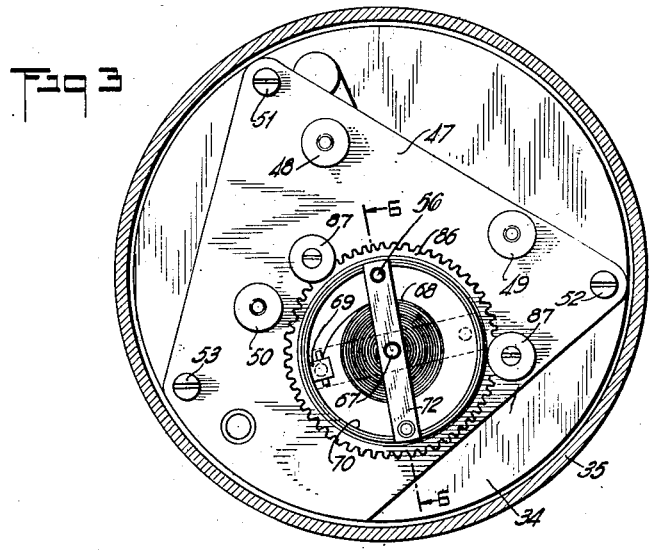
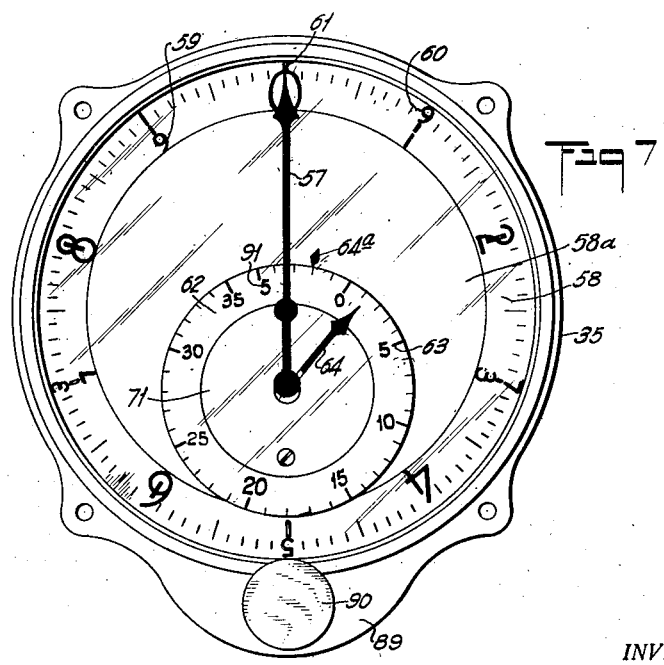
INVENTOR.
ADOLF URFER.
BY Stephen Cerstvik
ATTORNEY.

July 4, 1939.  A. URFER  2,164,601
SETTABLE ALTIMETER
Filed April 6, 1932  3 Sheets-Sheet 3
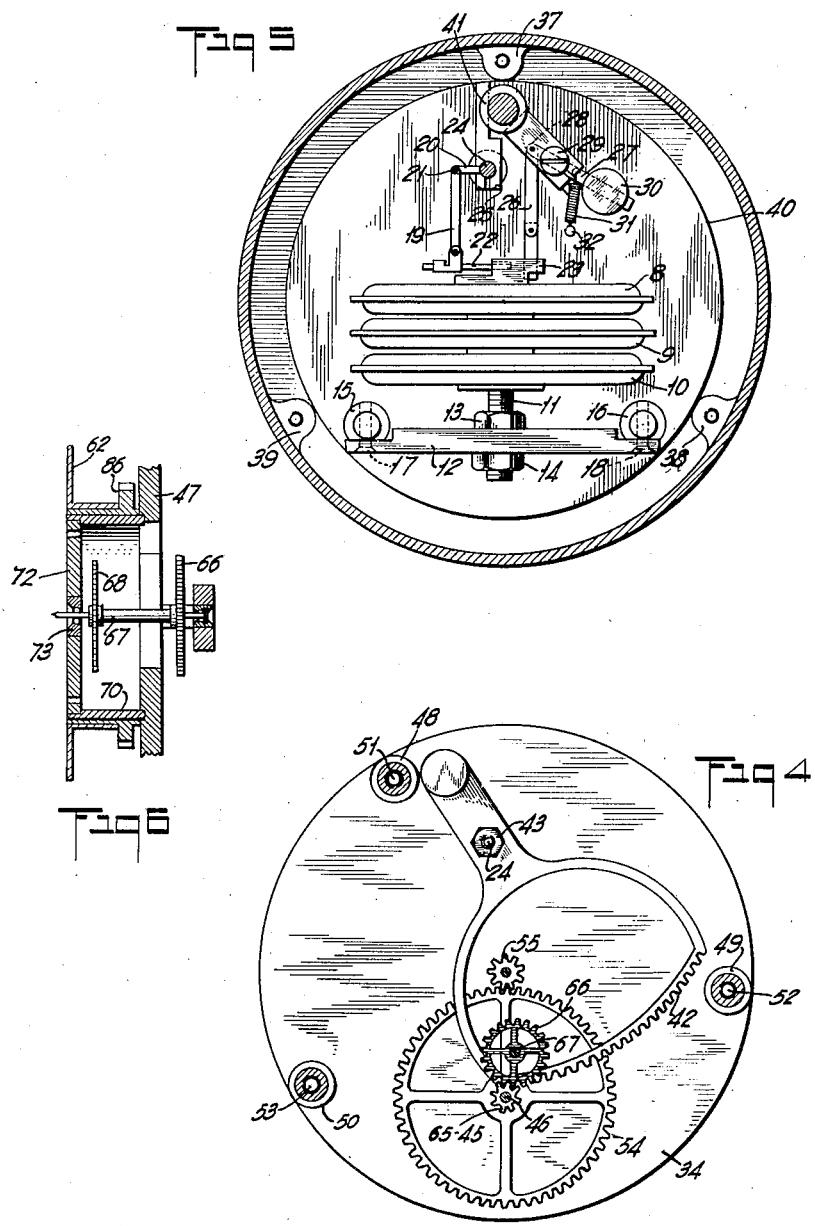
INVENTOR.
ADOLF URFER.
BY Stephen Cerstvik
ATTORNEY Patented July 4, 1939

2,164,601

UNITED STATES PATENT OFFICE 2,164,601

SETTABLE ALTIMETER

Adolf Urfer, Richmond Hill, N. Y., assignor to Bendix Aviation Corporation, South Bend, Ind., a corporation of Delaware Application April 6, 1932, Serial No. 603,647

12 Claims. (Cl. 73—4)

The present invention relates to indicating instruments and more particularly to sensitive instruments for indicating the altitude of an aircraft and suitable in assisting in the landing of an aircraft.

In devices of the above general type it is desirable that they be capable of adjustment under one condition for a second and predetermined condition so that they may indicate when said predetermined condition occurs or is reached.

In altimeters, and particularly sensitive altimeters embodying a plurality of scales and cooperating pointers for indicating altitude in hundreds and thousands of feet, this feature may be embodied therein in such a manner that the altimeter can be set at an airport having one pressure-level altitude with respect to sea-level for a pressure-level altitude of another airport to and at which it is desired to fly and land, so that when the aircraft lands at the second airport the altimeter will indicate zero altitude thereby providing the pilot with correct indications of the altitude of his craft with respect to the ground at the airport where he is going to land.

For purposes of illustration, assume that a pilot is going to fly from airport No. 1, the pressure-level altitude of which is 500 ft. above sea-level to airport No. 2, the pressure-level altitude of which is 1,000 ft. above sea-level. If the altimeter is not provided with adjusting means (except for adjusting to indicate zero at the particular altitude at which the craft is at the time) then when the pilot takes off from airport No. 1 and levels off to a flying altitude of 2,000 ft. for example (2,500 ft. above sea-level), upon reaching a position over airport No. 2 his altimeter will still indicate 2,000 ft. whereas his altitude above airport No. 2 is only 1500 ft. thus he would be led to believe that he is higher than he actually is and this would cause him to misjudge his landing in view of the fact that he would be on the ground when his altimeter would still indicate 500 ft. altitude. Therefore an adjustment must be provided in the altimeter whereby the latter can be set at airport No. 1 for the pressure-level altitude of airport No. 2 and to indicate such altitude on the instrument, simultaneously causing relative movement between the pointers and their respective scales so that when the aircraft reaches a position over airport No. 2 the altimeter will indicate the true altitude above the airport, that is the ground, and will show zero when the plane reaches the ground.

Heretofore various mechanisms have been provided for making an adjustment as described above in which the complete indicating unit, including the amplification mechanism and the pressure-sensitive element, was rotatable with respect to its casing, and the pointers and reference marks were rotatable with respect to each other and/or to the indicating mechanism. Such arrangements required complicated structures for providing the setting of the reference marks with respect to the dials and casing, and embodied numerous gear trains for this purpose. Accordingly one of the objects of the present invention is to provide a novel altimeter embodying novel adjusting and indicating means whereby the structure is substantially simplified and the setting and reading of the instrument greatly facilitated.

Another object of the invention is to provide in an indicating instrument, novel means whereby the instrument may be set for a predetermined condition and to indicate such predetermined condition upon its being reached and also to indicate the predetermined condition at the time that the setting is made on the instrument.

Another object is to provide in a sensitive altimeter embodying a plurality of scales and cooperating pointers, novel means whereby relative movement is produced between said scales and pointers for adjusting the altimeter so that it will produce a desired indication when a predetermined altitude is reached and for indicating such predetermined altitude on the scales when the setting is made.

A further object of the invention is to provide a novel sensitive altimeter including a plurality of scales and cooperating pointers relatively movable with respect to each other for indicating action and for setting to a predetermined altitude so that a desired reading may be obtained from the scales when the predetermined altitude is reached and means cooperating with the scales for indicating the altitude for which the instrument is set.

Still another object is to provide a novel instrument of the class described which is relatively simple in construction and yet efficient in operation and embodying relatively few parts whereby the instrument may be manufactured economically in large quantities.

The above and other objects and advantages will appear more fully hereinafter from a consideration of the detailed description which follows, together with the accompanying drawings wherein is illustrated one embodiment of the invention. It is to be expressly understood, however, that the drawings are for the purpose of illustration and description only and are not designed as a definition of the limits of the invention, reference being had for this purpose to the appended claims.

In the drawings wherein like reference characters refer to like parts through the several views, Fig. 1 is a longitudinal sectional view through the casing of one form of instrument showing the functional relationship of the various elements thereof embodying the present invention;

Fig. 3 is another cross sectional view taken on line 3—3 of Fig. 1;

Fig. 4 is a detailed view of the pointer gear train as viewed along line 4—4 of Fig. 1;

Fig. 5 is a sectional view taken on line 5—5 of Fig. 1 showing the amplification mechanism through which the pointers are actuated by the pressure responsive elements of the device.

Fig. 6 is a detailed section taken on line 6—6 of Fig. 3 showing the assembly of the small pointer and its cooperating dial; and Fig. 7 is a front view of one form of indicating instrument embodying the present invention.

Figure 1:
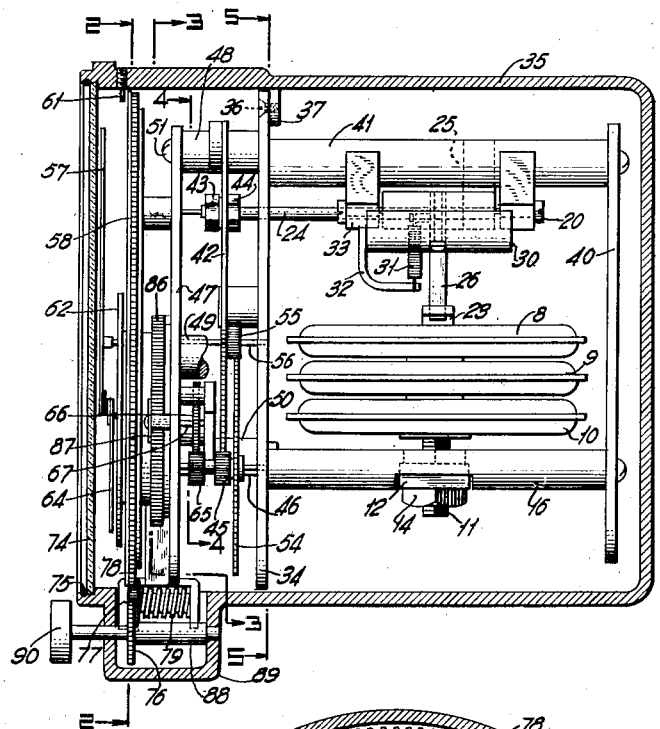

Referring to the drawings, and more particularly to Figs. 1, 4 and 5, the instrument embodying the present invention is shown in the form of an altimeter having an evacuated pressure-responsive device which is adapted to expand and contract upon variations of pressure due to changes in altitude, an amplification mechanism for amplifying the relatively small movements of the pressure-responsive device into readily discernible movements of a plurality of pointers over cooperating scales to indicate the altitude in feet or in meters or in terms of barometric pressure if desired, the pointers being secured together in such a manner that one moves only a fraction of a revolution for one complete revolution of the other, the latter indicating the altitude in hundreds of feet and the former in thousands of feet or in other units having the same or different ratios.

In the form shown the pressure-responsive device is constituted by one or more aneroid capsules, such for example as indicated at 8, 9 and 10 in Figs. 1 and 5, said capsules being carrreid by a supporting member in the form of a threaded shaft 11 secured to a cross member 12 in any suitable manner, as by means of nuts 13 and 14. The cross member 12 is also rigidly and permanently secured to a pair of spacing rod 15 and 16 in any suitable manner as by means of screws 17 and 18, respectively.

Means are now provided for employing and amplifying the movements of the aneroid capsules 8, 9 and 10, upon actuation thereof due to changes of pressure, to produce indications which, as stated hereinbefore, may be in terms of barometric pressure or of altitude in feet or meters. In the form shown, said means comprise a pair of links 19 and 20 pivotally connected at 21, the link 19 being connected to the aneroid capsule 8 through a temperature compensating element 22 to a bracket 23. The link 20 is rigidly connected to a rock-shaft 24 journaled in a member 25 for rocking movement upon actuation of the aneroid capsules 8, 9 and 10. The bracket 23 is also connected to a pair of links 26 and 27 which are pivoted together at 28, the link 27 being in turn pivoted at 29. A counterweight 30 is carried by the link 27, and a spring 31 is also connected to link 27 and to a member 32 secured to or formed integral with a supporting member 33 (Fig. 1) so that the entire elastic system is balanced in order to prevent movement thereof due to vibration, acceleration forces, etc., In other words, rock-shaft 24 is actuated only by the capsules 8, 9 and 10 through the links 19 and 20 and not by any desirable and extraneous forces. The rock-shaft 24 is also journaled in and extends through a plate 34 which is secured to and within the instrument casing 35 in any suitable manner as by means of screws 36 and bosses 37, 38 and 39, circumferentially spaced on the interior of said casing. Plate 34 together with a similar plate 40 form a fixed mounting for the aneroid capsules and the amplification mechanism, and are secured together in any suitable manner as for example by means of the spacing rods 15 and 16 to which the cross member 12 is secured and by means of a third spacing rod 41.

Figure 2:
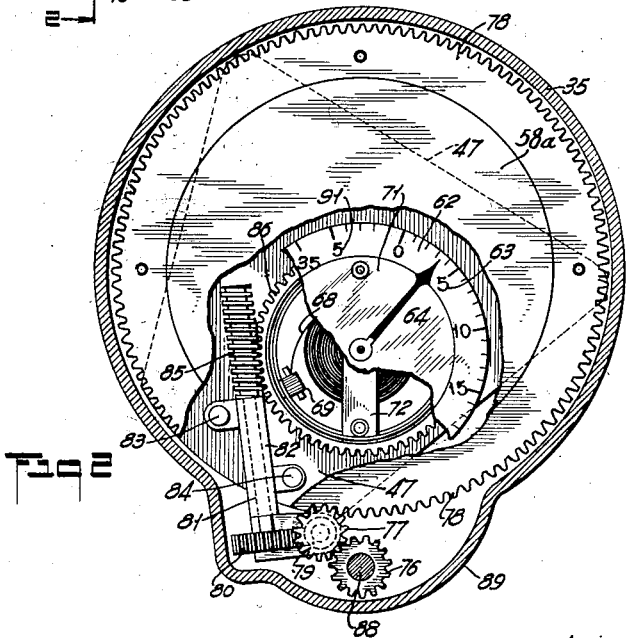
Fig. 2 is a cross sectional view taken on line 2—2 of Fig. 1.

The rock-shaft 24 has secured thereto a gear sector 42 in any suitable manner as by means of nuts 43 and 44 and is arranged to mesh with a pinion 45, the latter being carried by a countershaft 46 journaled in the plate 34 and in another plate 47 at the front of the casing, the plates 34 and 47 also being secured together in any suitable manner as by means of spacing rods 48, 49 and 50 and screws 51, 52 and 53 respectively. Secured to or formed integral with the shaft 46 is a relatively large gear 54 which meshes with a pinion 55 carried by a shaft 56 journaled in the plates 34 and 47 and extending through the latter plate, and has secured thereto a large pointer 57. Pointer 57 is arranged to traverse a large ring dial 58 which is journaled on and arranged to be rotated about a fixed plate 58a and which will be described more fully hereinafter, and on which are engraved or etched two concentric scales 59 and 60, the former scale cooperating with the pointer 57 to produce desired indications for the predetermined condition for which the instrument was set, and the latter scale cooperating with a fixed reference mark 61 secured to the casing for indicating the predetermined condition for which the setting has been made. Correlated with the dial 58 and movable relative thereto and simultaneously therewith with respect to the casing 35 is another but smaller ring dial 62 having a scale 63 which is graduated in thousaids of feet and has cooperating therewith a small pointer 64. A second fixed reference mark 64a inscribed on fixed plate 58a cooperates with scale 63 in the same manner as the reference mark 61 cooperates with the large scale 60. In order that the pointer 64 shall move with respect to its scale 63 and with the pointer 57 in the ratio existing between scales 59 and 63 the pointers are geared together in such a manner that the pointer 64 moves only a fraction of a revolution for one complete revolution of pointer 57 and for this purpose another pinion 65 is secured to or formed integral with the counter-shaft 46 and arranged to mesh with a gear 66 carried by a shaft 67 to which is secured the small pointer 64 and which rotates against the force of a hairspring 68, one end of which is secured to said shaft and the other end of which is secured to a lug or anchor 69 provided in the interior of a small cylindrical housing 70 the purpose of which is to take up back-lash in the pointer gear train. The housing or chamber 70 is secured to the plate 47 in any suitable manner as by means of a pressed fit and is covered by means of a plate 71 (Fig. 2) secured to a transverse member 72 fitted within and across the housing 70, said cross member 72 having formed therein a bearing 73 for the pointer shaft 67.

A cover-glass 74 of some suitable transparent material, which may be other than glass, is secured to the open end of the casing 35 in any suitable manner as by means of a clamping ring 75 so that the pointers 57 and 64 may be viewed therethrough in their cooperation with their respective scales 59 and 63.

It will be apparent from the foregoing that as the aneroid capsules 8, 9 and 10 are actuated by barometric pressure, the rock-shaft 24 is actuated through the links 19 and 20 to cause movement of the gear sector 42, thereby operating the pointers 57 and 64 in the proper ratio through the gear trains 45, 54, 55 and 45, 65, 66 respectively. It will also be apparent that the pointers 57 and 64 will indicate the altitude with respect to barometric pressure or sea-level and not the true altitude with respect to the ground; that is, the pointers will indicate zero only when the instrument is at sea level regardless of the altitude of the ground with respect to sea-level. It is further desirable that the instrument be capable of adjustment under one condition or altitude for a second condition or altitude and to indicate when the second condition occurs or is reached. This may be accomplished by causing relative movement of the dials 58 and 62 with respect to their pointers 57 and 64 in the same ratio as the pointers move with respect to the dials during indicating action. To this end novel means are provided whereby the foregoing adjustment can be made so that the pointers will indicate zero when the instrument reaches the altitude for which it was set and to indicate such altitude on the scale 60 when the setting is made.

In the form shown said means include a gear train constituted by gears 76, 77 and 78 for rotating the ring dial 58 at the same ratio about the fixed plate 58a at which the pointer 57 traverses the scale 59 on the dial 58 when the instrument is indicating, and a second gear train constituted by gears 76, 77 and a worm 79 carried on the same shaft with gear 77, and a worm gear 80 which is operated by the worm 79 and secured to or formed integral with a shaft 81 journaled in a sleeve 82 secured to the plate 47 as by means of rivets 83 and 84, and another worm 85 formed on the shaft 81 which meshes with a gear 86 journaled on the cylindrical housing 70 and to which is rigidly secured the small dial 62, whereby the latter is caused to rotate simultaneously with and relative to the large dial 58 in the same ratio as the small pointer 64 moves with respect to its scale 63 during indicating action. The gear 86 is held rotatable on the housing 70 in any suitable manner as by means of brackets shown at 87 in Figs. 1 and 3 secured to the plate 47. The gear 76 is secured to or formed integral with a shaft 88 journaled in the walls of an enlarged portion 89 of the casing 35 and is arranged to be actuated from the front of the casing by means of a knob 90 whereby the dials 58 and 62 are caused to rotate through their respective gear trains relative to the casing 35 and to their respective reference marks 61 and 64a.

It will be apparent from the foregoing that when the shaft 88 is rotated by turning the knob 90 the gear 76 will simultaneously rotate the gear 77 and the worm 79 thereby causing the dial 58 to be rotated about the fixed plate 58a by the gear 78 to which it is secured and also causing the dial 62 to be rotated about the housing 70 by the worm gear 80, worm 85 and gear 86 to which the small dial 62 is secured. Relative movement may be caused between the dials 58 and 62 and their respective pointers 57 and 64 and their respective reference marks 61 and 64a to any degree which may be desired so that said pointers will produce a desired indication on the scales, as for example a zero reading, when the desired condition or pressure-level altitude for which the instrument is set has been reached.

As has already been indicated above it is also desirable that the condition for which the instrument is to be set may be indicated at the time the setting is made so that such indication may be employed as a reference point. In other words, if it be desired to set the scales with respect to the pointers so that the latter will indicate zero when a certain altitude is reached it is essential that such condition be indicated at the time the setting is made. After the desired condition is indicated it is also essential that it remain unchanged during the actuation of the pointers by the change from the first or original condition to the second or pre-set condition and that the pointers operate independently to indicate when the desired condition is reached, as for example, by producing a zero indication upon reaching an airport having a certain pressure-level altitude, the latter of which may change from day to day due to changes of barometric pressure. The pre-set condition is indicated, as has already been stated, by means of the reference marks 61 and 64a on the scale 60 and a similar reverse scale 91 provided on the dial 62. It will therefore be apparent that as the dials are rotated clockwise for setting the instrument for a predetermined condition such condition will be indicated on the counter-clockwise scales 60 and 91 by the reference marks 61 and 64a respectively, at which time the zero marks of the respective scales are moved clockwise so that when the predetermined condition is reached the pointers 57 and 64 also move clockwise by their actuation from the aneroid capsules due to changes in barometric pressure produced by corresponding altitude changes, and will indicate zero. For example, assume that the instrument is at sea-level under normal barometric pressure at which time the pointers 57 and 64 indicate zero on their respective scales 59 and 63. If the pilot of the craft on which the instrument is mounted now desires to fly to a landing field which has a pressure-level altitude of 3,300 ft., for example, he rotates the knob 90 until the outer indicating mark corresponding to 3,000 ft. on the scale 91 to the left of the zero mark on the dial 62 coincides with the reference mark 64a, and the numeral 3 on the outer scale 60 of the large dial 58 corresponding to 300 ft. coincides with the reference mark 61. The pointers 57 and 64 no longer indicate zero on their scales but bear such a relation thereto that when the altitude of 3,300 ft. is reached the pointers will move clockwise along the scales 59 and 63 until they reach their respective zero marks thereby indicating that the altitude of 3,300 ft. has been reached. The setting between the dials and the reference marks however remains unchanged during the indicating action of the pointers and until the instrument is again adjusted by rotating the dials by means of the knob 90.

There is thus provided a novel indicating device which may be set under one condition for a second condition so that it will indicate when the second condition occurs or is reached and which also indicates on the same dials but on different scales concentric with the scales which indicate changes in altitude during flight, and, as pointed out hereinbefore, the invention is particularly suitable for use in a sensitive altimeter whereby a pilot can set his instrument at a flying field having one pressure-level altitude so that it will indicate zero when he reaches a second field whose pressure-level altitude is different from that of the first flying field and which altitude can be set into the instrument and indicated by reference marks cooperating with proper scales provided for the purpose.

Although only one embodiment of the invention has been illustrated and described other changes and modifications which will now appear to those skilled in the art may be made without departing from the scope of the invention. Reference is therefore to be had to the appended claims for a definition of the limits of the invention.

What is claimed is:

1. An altimeter including a pressure-sensitive element, movable pointers operated by said element in different ratios, rotatable dials cooperating with said pointers for indicating action, stationary reference means cooperating with the dials for indicating a predetermined condition, and means for rotating said dials with respect to said pointers and reference means for setting the altimeter for the predetermined condition.

2. An altimeter including a stationary pressure-sensitive element, a pair of pointers, drive means for operating said pointers by changes in pressure on said element, one of said pointers being driven one complete revolution for a fraction of a revolution of the other, rotatable dials cooperating with said pointers for indicating action, stationary reference marks for each of said dials for indicating a predetermined condition, and means for rotating said dials relative to each other and to the pointers and reference marks for establishing a predetermined relation between said dials and pointers whereby the latter will produce a desired indication when the predetermined condition occurs, said condition being indicated on said dials by said reference marks.

3. An altimeter including a pressure-responsive element, a plurality of pointers operated by said element, rotatable dials for the respective pointers, reference means for the respective dials, separate scales on each of said dials, one of the scales on each dial cooperating with its respective pointer for indicating action, another of the scales on each of said dials cooperating with the reference means for setting, and means for rotating said dials in different ratios with respect to said pointers and reference means to set the altimeter for a predetermined condition.

4. An altimeter including a pressure-responsive element, a pair of pointers operated by said element, rotatable dials for each of said pair of pointers and graduated in different ratios of the same units, reference marks for the respective dials, separate scales on each dial and increasing in value in opposite directions, one of the scales cooperating with a pointer and the other scale cooperating with a reference mark, and means for rotating said dials with respect to said pointers and reference marks for setting the altimeter to a predetermined condition which is indicated by said reference marks.

5. An altimeter including a pressure-responsive element, a pair of pointers operated thereby, rotatable dials for each of said pair of pointers and graduated in different ratios of the same units, stationary reference marks for the respective dials, two concentric scales on each dial and increasing in value in opposite directions, one of said scales cooperating with its pointer and the other scale cooperating with its reference mark, drive means interconnecting said dials for relative movement therebetween and with respect to the pointers and reference marks in the same ratio as the pointers are operated during indicating action, and means for actuating said drive means for setting the altimeter.

6. An indicating instrument including an actuating device, movable pointers operated by said device in different ratios, rotatable dials rotatable with respect to said pointers, stationary reference means cooperating with the dials for indicating a predetermined condition for which the instrument is adapted to be set, and means for rotating said dials with respect to said pointers and reference means for setting the instrument for the predetermined condition so that the reference means indicate the predetermined condition and so that such a relation is established between the pointers and the dials that the pointers will produce a desired indication when the predetermined condition occurs.

7. An indicating instrument including a fixed actuating device, a pair of pointers, drive means for operating said pointers by said actuating device, one of said pointers being driven one complete revolution for a fraction of a revolution of another, rotatable dials cooperating with said pointers for indicating action, stationary reference marks for each of said dials for indicating a predetermined condition, and means for rotating said dials relative to each other and to the pointers and reference marks for establishing a predetermined relation between said dials and pointers whereby the latter will produce a desired indication when the predetermined condition occurs, said condition being indicated on said dials by said reference marks.

8. An indicating instrument including an actuating device, a plurality of pointers operated by said device, rotatable dials for the respective pointers, stationary reference marks for each of said dials for indicating a predetermined condition, separate scales on each of said dials, one of the scales on each dial cooperating with its respective pointer for indicating action, another of the scales on each of said dials cooperating with the reference marks for setting, and means for rotating said dials in different ratios with respect to said pointers and reference marks to set the instrument for a predetermined condition.

9. An indicating instrument including an actuating device, a pair of pointers operated by said device, rotatable dials for said pointers and graduated in different ratios of the same units, reference marks for the respective dials, separate scales on each dial increasing in value in opposite directions, one of the scales cooperating with a pointer and the other scale cooperating with a reference mark, and means for rotating said dials with respect to said pointers and reference marks for setting an altimeter to a predetermined condition which is indicated by said reference marks.

10. An indicating instrument including an actuating device, a pair of pointers operated thereby, rotatable dials for said pointers and graduated in different ratios of the same units, stationary reference marks for the reference dials, two concentric scales on each dial increasing in value in opposite directions, one of said scales cooperating with its pointer and the other scale cooperating with its reference mark, drive means interconnecting said dials for relative movement therebetween and with respect to said pointers and reference marks in the same ratio as the pointers are operated during indicating action, and means for actuating said drive means for setting the instrument.

11. An altimeter having a plurality of indicating elements, a dial means therefor calibrated in units corresponding to barometric pressures, atmospheric pressure sensitive means for moving the elements according to a predetermined ratio, and a reference element, the dial means and reference element being movable relatively to each other in setting, the dial means including a plurality of dials movable in setting according to said predetermined ratio, at least one of the dials having a scale for an indicating element and a scale for the reference element, said scales increasing in opposite directions, and setting means for moving the dials.

12. An altimeter including a barometric pressure responsive device, a plurality of pointers actuated by said device according to a predetermined ratio, scale means for said pointers, reference indicating means, and setting means for causing a change in the indications of said pointers on said scale means according to said predetermined ratio and a simultaneous synchronous change in the indications of said reference indicating means while said pressure responsive device remains stationary except for expansion and contraction thereof due to changes of barometric pressure.

ADOLF URFER.